United States Patent [19]

Erdmann

[11] 4,362,235

[45] Dec. 7, 1982

[54] APPARATUS FOR ASSEMBLING ARRAYS OF CIGARETTES OR THE LIKE

[75] Inventor: Otto Erdmann, Hamburg, Fed. Rep. of Germany

[73] Assignee: Hauni-Werke Körber & Co., KG, Hamburg, Fed. Rep. of Germany

[21] Appl. No.: 188,255

[22] Filed: Sep. 19, 1980

[30] Foreign Application Priority Data

Sep. 25, 1979 [DE] Fed. Rep. of Germany ....... 2938613

[51] Int. Cl.³ ...................... B65G 57/09; B65G 57/18
[52] U.S. Cl. ..................................... 198/419; 53/149; 53/150; 53/151; 53/240; 198/420
[58] Field of Search ................. 53/148, 149, 150, 151, 53/534, 575, 240; 198/419, 420, 429, 433

[56] References Cited

U.S. PATENT DOCUMENTS

| 675,181 | 5/1901 | Wills | 53/151 X |
|---|---|---|---|
| 1,587,418 | 6/1926 | Reyes | 15/151 X |
| 1,926,554 | 9/1933 | Muller | 53/150 X |
| 2,500,699 | 3/1950 | Nakaura | 198/420 X |
| 3,435,940 | 4/1969 | Seragnoli | 53/150 X |
| 3,642,112 | 2/1972 | Seragnoli | 198/419 |
| 3,771,279 | 11/1973 | Seragnoli | 53/151 X |

FOREIGN PATENT DOCUMENTS

| 2243911 | 3/1974 | Fed. Rep. of Germany | 53/150 |
|---|---|---|---|
| 520854 | 5/1940 | United Kingdom | 53/151 |

Primary Examiner—John Sipos
Attorney, Agent, or Firm—Kontler, Grimes & Battersby

[57] ABSTRACT

Apparatus for assembling multi-layer arrays of cigarettes in a packing machine has a magazine with a reciprocable support having platforms at different levels and a group of cigarette-delivering downwardly extending ducts above each platform so that each platform normally supports a layer of cigarettes. An intermittently driven conveyor has a series of receptacles which are adjacent to one side of the magazine and are open at least at those ends which face the platform. The magazine has elongated slot-shaped openings which are adjacent to the platforms and serve for evacuation of layers from the magazine into the neighboring receptacles during the periods of dwell of the conveyor and in response to penetration of reciprocable pushers into the magazine to move each layer along the respective platform, through the aligned opening and into the adjacent receptacle. Each next-following receptacle contains a larger number of layers than the preceding receptacle, and the articles of the layers are held against uncontrolled movement during transfer from the magazine as well as during movement with the receptacles by elongated plate-like guide members which overlie the layers issuing from the adjacent openings and which also partially overlap each other. Each guide member which is adjacent to a preceding opening, as considered in the direction of intermittent movement of the conveyor, extends toward and along the next-following opening. The last guide member extends toward and along an evacuating station where the arrays are expelled from successive filled receptacles. The layers are condensed by a reciprocable bottom portion of the magazine prior to transfer into the receptacles.

14 Claims, 7 Drawing Figures

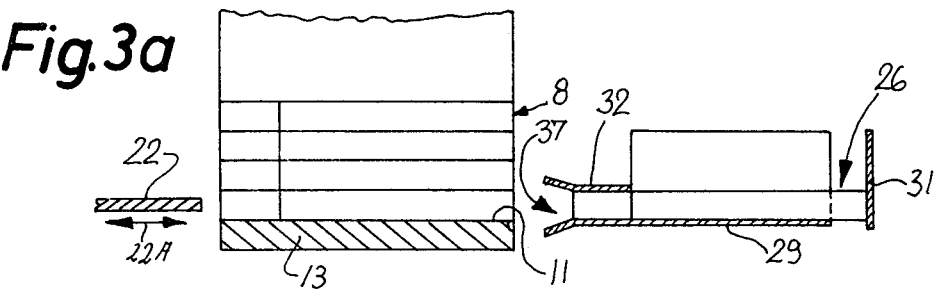
Fig.3a
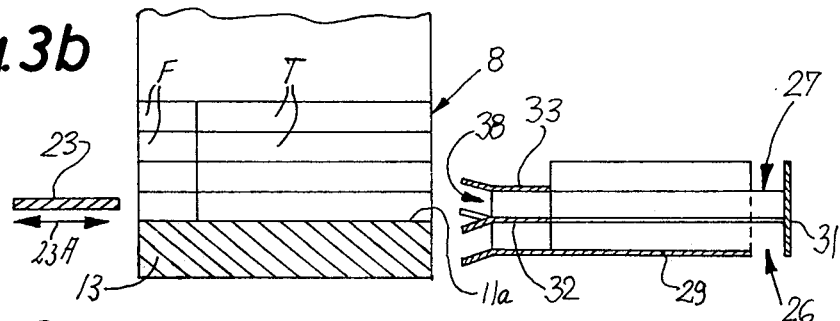
Fig.3b
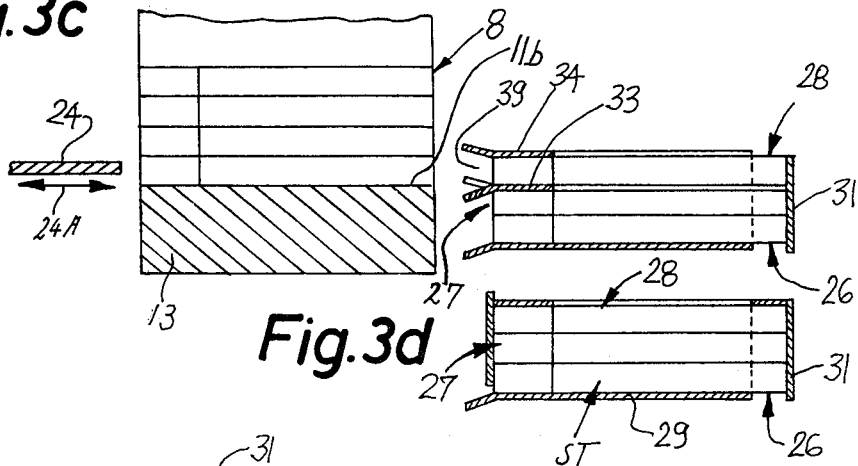
Fig.3c
Fig.3d
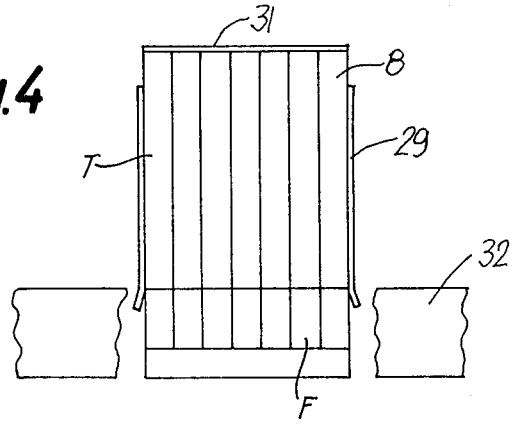
Fig.4

APPARATUS FOR ASSEMBLING ARRAYS OF CIGARETTES OR THE LIKE

BACKGROUND OF THE INVENTION

The present invention relates to improvements in apparatus for assembling groups of cigarettes or the like. More particularly, the invention relates to improvements in apparatus for accumulating arrays of identical elongated rod-shaped articles which constitute or form part of smokers' products. Such products include plain or filter tipped cigarettes, cigarillos, cigars or cheroots.

Groups of plain or filter tipped cigarettes or analogous rod-shaped smokers' products (hereinafter called cigarettes or filter cigarettes for short) must be assembled in packing machines wherein arrays of four, five, ten, twenty or twenty-one cigarettes must be introduced into successive packets which are thereupon closed and sealed to form soft or hinged-lid cigarette packs. In many instances, an array consists of three parallel layers of cigarettes including two outer layers of seven cigarettes each and an intermediate layer consisting of six cigarettes which are staggered with respect to the cigarettes of the outer layers. Such arrays are known as quincunx formations.

It is already known to assemble arrays or groups of cigarettes which consist of several superimposed layers by resorting to an apparatus having a supply magazine with several openings disposed at different levels so that each of the openings (which is normally an elongated slot) is in register with a discrete layer of cigarettes. The magazine is adjacent to an intermittently driven conveyor with a plurality of pocket-shaped receptacles which are moved seriatim into register with successive openings of the magazine. Such conventional apparatus further comprises pushers which are actuated to penetrate through the openings and to expel the respective layers of cigarettes into the adjacent receptacles during the intervals between successive forward movements of the conveyor. An advantage of the just-described conventional apparatus is that the formation of arrays each consisting of two or more overlapping or superimposed layers of cigarettes takes up less time than the assembly of arrays in certain previously utilized apparatus wherein a complete array is assembled in the magazine prior to expulsion into an adjacent receptacle or directly into a hollow mandrel on an indexible turret of a cigarette packing machine. This is due to the fact that gravitational descent of several layers of cigarettes to a position in which the cigarettes form a complete multilayer group takes up a relatively long interval of time, especially when compared with the interval which is required for the assembly of discrete layers of cigarettes. Thus, gravitational descent of three discrete layers of cigarettes into register with three discrete openings of the magazine takes up a small fraction of that interval which is required to accumulate a complete group consisting of three superimposed layers of cigarettes such as are customary in 20-cigarette packs. However, the just-described apparatus which assemble discrete layers of cigarettes also exhibit certain drawbacks, especially as concerns the quality of cigarettes in the arrays. This is due to the fact that the cigarettes are subjected to pronounced accelerating and decelerating forces during transfer into the receptacles as well as during transport to move the receptacles into register with successive openings of the magazine. Rapid intermittent movements of the conveyor (at right angles to the axes of the cigarettes in the receptacles) are desirable and necessary in a modern packing machine which must process the output of at least one high-speed cigarette maker or filter tipping machine. Such output is in the range of at least 100 cigarettes per second. Rapid acceleration and deceleration of cigarettes which are being delivered into or which are advanced with the receptacles of the conveyor results in the development of substantial stresses which are likely to entail deformation of the wrappers and/or escape of tobacco at one or both ends, depending upon whether the articles to be processed are plain or filter cigarettes.

An additional drawback of the just-described conventional apparatus is that the cigarettes of discrete layers are likely to change their orientation due to the fact that the conveyor is caused to perform intermittent movements at a very high speed. The likelihood of misorientation of cigarettes is especially pronounced during those stages of transport of cigarettes past the magazine when the corresponding receptacles contain a single layer or less than a full complement of cigarettes. For example, the cigarettes are likely to lie askew in receptacles which are designed for accumulation of arrays containing three superimposed layers of cigarettes during that interval which elapses while a receptacle contains a single layer or two layers of cigarettes. Absence of proper orientation of cigarettes invariably results in deformation or destruction of some or all of the cigarettes in a group, and such groups are detected by customary monitoring means of a packing machine and segregated from satisfactory groups so as to ensure that each and every pack which reaches the customer contains a predetermined number of satisfactory rod-shaped smokers' products.

OBJECTS AND SUMMARY OF THE INVENTION

An object of the invention is to provide a novel and improved apparatus for accumulation of groups or arrays of cigarettes or analogous rod-shaped articles in a simple and time-saving manner without any or with negligible misorientation of articles during assembly into groups.

Another object of the invention is to provide the apparatus with novel and improved means for controlling the positions of rod-shaped articles prior to, during as well as subsequent to transfer into the receptacles of an intermittently driven conveyor.

A further object of the invention is to provide novel and improved means for confining the rod-shaped articles to permissible movements during transfer from the magazine into the receptacles and for preventing misorientation of articles subsequent to entry into the respective receptacles, i.e., while the articles move sideways.

Still another object of the invention is to provide the apparatus with a novel and improved magazine which can ensure that each and every layer of rod-shaped articles contains a predetermined number of articles which are disposed at an optimum distance from each other.

Another object of the invention is to provide a novel and improved group assembling apparatus which can be readily incorporated in or combined with existing cigarette packing or analogous machines.

A further object of the invention is to provide an apparatus which can be used for accumulation of groups consisting of a wide variety of rod-shaped articles constituting or forming part of smokers' products.

An ancillary object of the invention is to provide an apparatus which ensures that the orientation of rod-shaped articles is not changed even if the speed of the conveyor and its receptacles is abruptly increased or reduced well beyond the presently permissible abrupt increase or reduction of speed of the conveyors in conventional group assembling apparatus.

Another object of the invention is to provide an apparatus which can assemble any desired array or arrays of cigarettes or analogous rod-shaped articles as long as the arrays consist of at least two layers of articles.

An additional object of the invention is to provide an apparatus which comprises a small number of simple movable parts and wherein the movements of such movable parts can be readily synchronized with the movements of other parts in a cigarette packing or like machine.

The invention is embodied in an apparatus for assembling groups or arrays of overlapping layers of parallel cigarettes or analogous rod-shaped articles which constitute or form part of smokers' products. The apparatus comprises conveyor means (e.g., an endless chain conveyor which is trained over several sprocket wheels and has an elongated horizontal stretch) movable in a predetermined direction along a predetermined path and including a series of preferably equidistant receptacles, and a supply magazine for storage of a supply of parallel rod-shaped articles. The magazine has a series of openings, as considered in the direction of intermittent movement of the conveyor means, and the openings are disposed in different planes and each thereof registers with a different receptacle of the conveyor means during each period of dwell of the conveyor means. The magazine includes several groups of ducts, one group for each opening, which serve to accumulate successive layers of parallel articles in alignment with the corresponding openings. The apparatus also comprises reciprocable pushers, one for each opening, or analogous means for transferring layers of articles through the openings of the magazine and into the registering receptacles during each interval of dwell of the conveyor means whereby each receptacle which registers with a preceding opening, as considered in the direction of intermittent movement of the conveyor means, contains a lesser number of layers than the next-following receptacle wherein the layers overlie each other as a result of disposition of openings in different planes. Still further, the apparatus comprises guide members (preferably a discrete guide member for each opening of the magazine) which are preferably stationary and are adjacent to the openings. Each guide member overlies at least a portion of the layer which issues by way of the adjacent opening to ensure that the orientation of articles in the respective layer remains at least substantially unchanged during transfer from the magazine into the respective receptacle.

The conveyor means is preferably movable along a path which is spaced apart from the magazine, and the guide members may constitute elongated sheet- or plate-like bodies which overlie the layers of articles between the openings of the magazine and the adjacent open ends of the receptacles. Each guide member can be provided with a mouthpiece which flares outwardly toward the adjacent opening to facilitate the transfer of layers from the magazine into the receptacles. The guide members preferably partially overlap and are spaced-apart from each other. Thus, each preceding guide member can extend along the next-following opening and is overlapped by the next guide member in the region and at least along the length of such next-following opening. The openings are preferably disposed at different levels, namely, each preceding opening is located at a level below the level of the next-following opening.

The novel features which are considered as characteristic of the invention are set forth in particular in the appended claims. The improved apparatus itself, however, both as to its construction and its mode of operation, together with additional features and advantages thereof, will be best understood upon perusal of the following detailed description of certain specific embodiments with reference to the accompanying drawing.

BRIEF DESCRIPTION OF THE DRAWING

FIG. 1 is a somewhat schematic longitudinal vertical sectional view of a supply magazine which forms part of the improved apparatus and can simultaneously accumulate three discrete layers of articles at three different levels;

FIG. 2 is a smaller-scale side elevational view of the magazine and a fragmentary partly schematic and partly longitudinal vertical sectional view of the conveyor with receptacles for accumulation of arrays of twenty rod-shaped articles each;

FIG. 3a is a fragmentary transverse vertical sectional view as seen in the direction of arrows from the line IIIa—IIIa of FIG. 2;

FIG. 3b is a fragmentary transverse vertical sectional view as seen in the direction of arrows from the line IIIb—IIIb of FIG. 2;

FIG. 3c is a fragmentary transverse vertical sectional view as seen in the direction of arrows from the line IIIc—IIIc of FIG. 2;

FIG. 3d is a transverse vertical sectional view as seen in the direction of arrows from the line IIId—IIId of FIG. 2; and FIG. 4 is a plan view of a filled or partly filled receptacle.

DESCRIPTION OF THE PREFERRED EMBODIMENTS

Figures 1, 2:
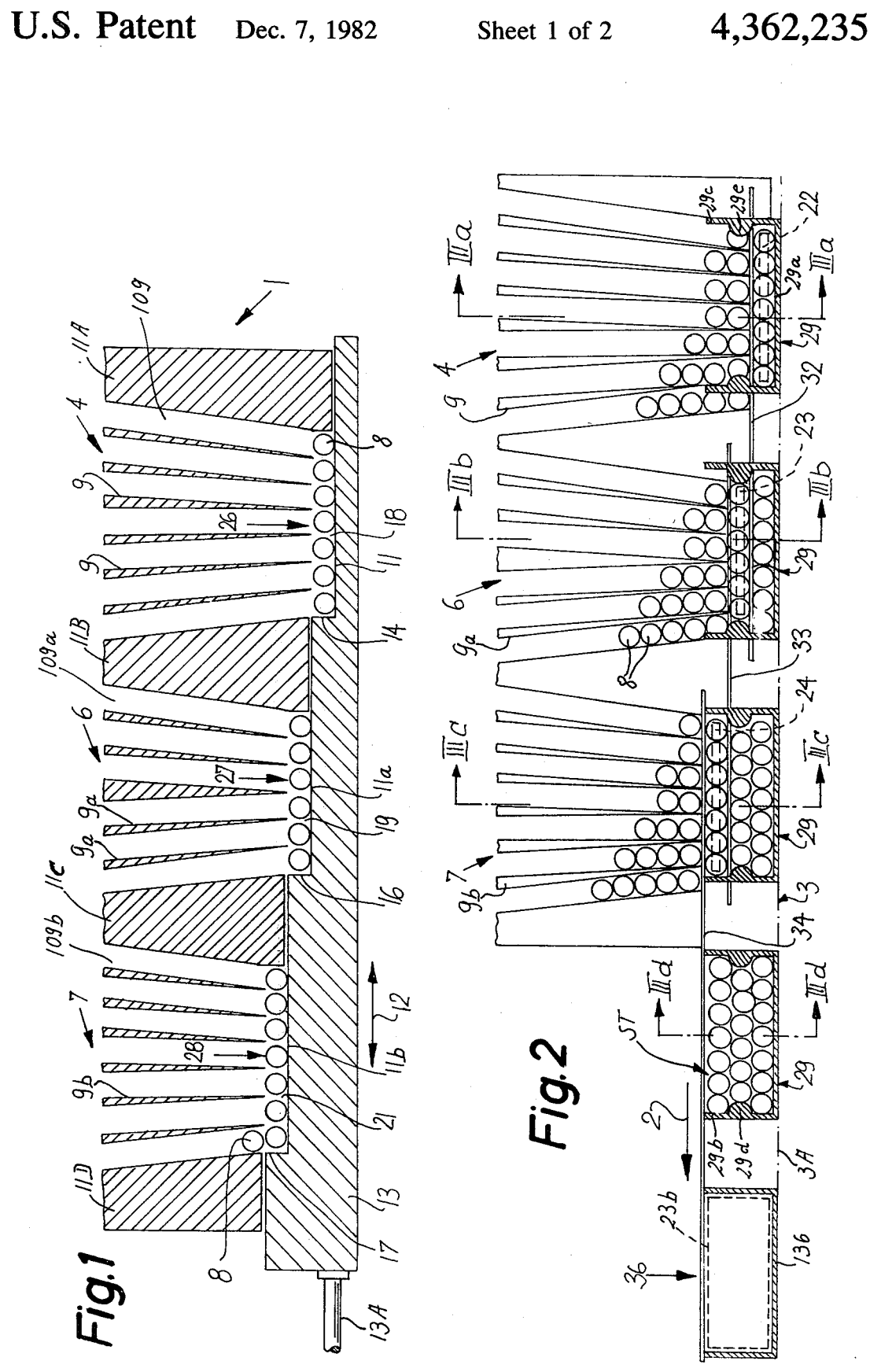

Referring first to FIGS. 1 and 2, there is shown an apparatus which accumulates arrays or groups ST of twenty rod-shaped articles 8 each. The articles 8 are filter cigarettes each of which has a tobacco-containing portion T and a filter plug F (see FIGS. 3a, 3b, 3c, 3d and 4). The apparatus comprises a supply magazine 1 which is provided with means for forming three discrete layers 26, 27, 28 of parallel cigarettes 8. The layers 26 and 28 contain seven parallel cigarettes 8 each, and the layer 27 contains six parallel cigarettes 8. The level at which the layer 26 is formed is located below the level of accumulation of cigarettes 8 which form the layer 27, and the level of the layer 27 is located below the level of the layer 28. To this end, the magazine 1 comprises a stepped support 13 having three horizontal platforms 11, 11a and 11b. The platform 11 supports successively formed layers 26, the platform 11a supports successively formed layers 27, and the platform 11b supports successively formed layers 28. The difference between the levels of the platforms 11, 11a, and $11b$ equals or slightly exceeds the diameter of a cigarette 8.

The supply magazine 1 further comprises four stationary upright or nearly upright walls 11A, 11B, 11C and 11D. The space between the walls 11A and 11B contains six substantially wedge-like walls or partitions 9 which extend downwardly to terminate at a level above the platform 11. The distance between the platform 11 and the tips or lower end portions of the partitions 9 slightly exceeds the diameter of a cigarette 8. The space between the walls 11B and 11C contains five walls or partitions $9a$, and the distance between the lower end portions or tips of the partitions $9a$ and the platform $11a$ again equals or slightly exceeds the diameter of a cigarette 8. The space between the walls 11C and 11D confines six substantially upright walls or partitions $9b$ the lower end portions of which are spaced apart from the platform $11b$. The distance between the platform $11b$ and the tips or lower end portions of the partitions $9b$ again equals or slightly exceeds the diameter of a cigarette 8. As mentioned above, the walls 11A–11D are stationary. On the other hand, the stepped support 13 is reciprocable in directions which are indicated by the double-headed arrow 12. The means for reciprocating the support 13 comprises a motor here shown as a double-acting hydraulic or pneumatic cylinder and piston unit having a piston rod 13A coupled to one end portion of the support 13. The extent of reciprocatory movement of the support 13 between a first end position which is shown in FIG. 1 and a second end position (to the right of the end position shown in FIG. 1) is sufficient to ensure that the spaces or gaps between neighboring cigarettes 8 of the layers 26, 27 and 28 disappear when the support 13 reaches its right-hand or second end position. The spaces in which the layers 26, 27 and 28 accumulate on the respective platforms 11, $11a$ and $11b$ are sufficiently wide (as considered in the directions indicated by the arrow 12) to allow for unimpeded descent of cigarettes 8 through the ducts 109, $109a$, $109b$ which are respectively defined by the partitions 9, $9a$ and $9b$. The left-hand end portion of the platform 11 is adjacent to an upwardly extending shifting surface or shoulder 14 which is defined by the support 13 and condenses the layer 26 when the support 13 is caused to assume its second end position. Analogously, the left-hand end portion of the platform $11a$ is adjacent to a shifting surface or shoulder 16 which serves to condense the layer 27, and the left-hand end portion of the platform $11b$ is adjacent to a shifting surface or shoulder 17 which condenses the layer 28 when the support 13 is moved to its right-hand end position, as viewed in FIG. 1. The shoulders 14, 16, 17 can move the leftmost cigarettes 8 of the layers 26, 27, 28 in a direction toward the rightmost cigarettes of the respective layers, as viewed in FIG. 1. The ducts 109 between the stationary walls 11A, 11B form a group 4 of seven downwardly extending ducts each having a width which slightly exceeds the diameter of a cigarette 8 so that the cigarettes can readily descend onto the platform 11. The magazine 1 comprises a funnel-shaped upper portion or hopper (not shown) which contains a large quantity of parallel cigarettes 8. The upper portion of the magazine 1 preferably further comprises one or more agitators (not shown) which serve to ensure that the ducts 109, $109a$ and $109b$ are invariably filled with rows of superimposed cigarettes 8. The ducts $109a$ between the stationary walls 11B, 11C form a group 6 of six downwardly extending ducts, and the ducts $109b$ between the stationary walls 11C, 11D form a group 7 of seven downwardly extending ducts which are continuously supplied with cigarettes 8 from the aforementioned main or upper portion of the magazine 1. Reference may be had to commonly owned U.S. Pat. No. 3,501,052 granted Mar. 17, 1970 to Rudszinat.

The apparatus further comprises an intermittently driven conveyor 3 which is adjacent to one side of the supply magazine 1 (the conveyor is located in front or behind the support 13, as viewed in FIG. 1). The conveyor 3 includes one or more endless chains or other suitable flexible elements 3A supporting a series of equally spaced receptacles 29 each of which is a substantially U-shaped pocket. The manner in which the receptacles 29 are articulately connected to the flexible element or elements 3A forms no part of the present invention. Each filled receptacle 29 contains a block or array ST of twenty cigarettes 8 in the customary formation, namely, two outer layers (26 and 28) of seven cigarettes each and a median layer (27) consisting of six cigarettes. The cigarettes of the median layer are staggered with reference to the cigarettes of the two outer layers. This can be readily seen in FIG. 2 wherein the leftmost receptacle 29 contains a full array ST of twenty cigarettes 8. The width of each receptacle 29 is such that it can accommodate three condensed superimposed layers 26–28. The flexible element or elements 3A are trained over suitable sprocket wheels or pulleys (not shown) one of which is driven to advance the receptacles 29 stepwise in the direction indicated by arrow 2 shown in FIG. 2. Each time the conveyor 3 is brought to a halt, three of its receptacles 29 register with the groups 4, 6, 7 of ducts 109, $109a$, $109b$, respectively. The supply magazine 1 has three elongated slot-shaped horizontal openings 18, 19, 21 which are respectively disposed above the platforms 11, $11a$, $11b$ and serve for evacuation of the respective layers 26, 27, 28 from the supply magazine and into the adjacent receptacles 29 during the intervals of dwell of the conveyor 3. As mentioned before, the conveyor 3 is adjacent to one side of the supply magazine 1. The other side of the magazine 1 is adjcent to a set of three transfer members or pushers 22, 23, 24 (see FIGS. 2, $3a$, $3b$ and $3c$). The pushers 22, 23 and 24 are reciprocable in directions which are respectively indicated by double-headed arrows 22A, 23A, 24A (FIGS. $3a$–$3c$) to expel layers of cigarettes through the aligned openings 18, 19, 21 while moving in a direction to the right, as viewed in FIG. $3a$, $3b$ or $3c$.

Each receptacle 29 is open at both ends so that one of its open ends can register with the opening 18, 19 or 21 during travel past the support 13, and that its other open end can register with a channel 136 at an evacuating station 36 where the arrays or blocks ST are expelled into the packing machine proper for introduction into envelopes so that the envelopes and the respective arrays ST form customary cigarette packs. A packing machine which can utilize the apparatus of the present invention is disclosed in commonly owned U.S. Pat. No. 3,735,767 granted May 29, 1973 to Kruse et al. The disclosure of the patent to Kruse et al. is incorporated herein by reference.

FIG. 2 shows that each receptacle 29 comprises a bottom panel $29a$ which supports the layer 26, two lateral panels $29b$, $29c$ which flank the layers or the respective array, and two inwardly extending elongated projections or beads $29d$, $29e$ which form part of or are secured to the lateral panels $29b$, $29c$ and ensure that the cigarettes 8 of the median layer 27 are staggered with reference to the cigarettes of the two outer layers 26, 28.

The path of the conveyor 3 extends between one side of the support 13 and a stationary plate-like stop or baffle 31 which limits the extent to which the cigarettes 8, which are expelled from the supply magazine 1 by the respective pushers 22, 23, 24, can advance in a direction to the right, as viewed in FIG. 3a, 3b or 3c. The stop 31 is secured to the frame (not shown) of the apparatus or directly to the frame of the packing machine.

The apparatus further comprises several plate- or strip-shaped stationary guide members or guides 32, 33, 34 which are respectively located above the paths of layers 26, 27, 28 during expulsion of such layers from the respective portions of the supply magazine 1. The length of the guide member or guide 32 equals or approximates the length of the guide 33, as viewed in the direction of arrow 2. Such length equals or approximates the distance which a receptacle 29 covers during each intermittent advance of the conveyor 3. As shown in FIG. 2, the guide 32 overlaps the layer 26 immediately after expulsion via opening 18 and during transport toward a position below the platform 11a. The guide 33 overlaps the layer 27 immediately subsequent to expulsion via opening 19 and during transport toward the position below the platform 11b. The guide 34 is somewhat longer and overlaps a freshly expelled layer 28 immediately subsequent to expulsion via opening 21 as well as during transport of such layer (which forms part of a complete array or block ST) all the way to the evacuating station 36. The guides 32, 33, 34 may consist of sheet metal or of sheet- or plate-like synthetic plastic material. The guide 32 cooperates with the bottom panel 29a of a receptacle which is adjacent to the platform 11 to confine the layer 26 during transfer into such receptacle, the guides 32, 33 and the bottom panel 29a of a receptacle 29 which is adjacent to the platform 11a cooperate to confine the layers 26, 27, and the guides 32, 33, 34 and the bottom panel 29a cooperate when a receptacle 29 reaches the platform 11b to confine all three layers 26, 27, 28 of a freshly assembled array or block ST. The distance between the level of the guide 32 and the bottom panels 29a of receptacles 29 which are adjacent to the magazine 1 equals or slightly exceeds the diameter of a cigarette 8. The distance between the guides 32, 33 also equals or slightly exceeds the diameter of a cigarette 8, and the same holds true for the distance between the guides 33 and 34. It will be noted that the height of the fully assembled array or block ST decreases somewhat when such array advances beyond the position of register with the platform 11b (namely, toward the evacuating station 36) because the combined height of the three superimposed layers 26, 27, 28 is slightly less than three cigarette diameters due to the fact that the cigarettes can assume the aforementioned quincunx formation as soon as they advance beyond the left-hand marginal portion of the guide 33, as viewed in FIG. 2.

As shown in FIGS. 3a, 3b and 3c, the guides 32, 33, 34 are respectively formed with mouthpieces 37, 38, 39 which diverge in a direction toward the adjacent of the supply magazine 1 so as to facilitate introduction of the respective layers 26, 27, 28 into the receptacles 29 of the conveyor 3. The mouthpiece 37 facilitates unimpeded transfer of a layer 26 from the platform 11 onto the bottom panel 29a of the adjacent receptacle 29, the mouthpiece 38 facilitates the transfer of the layer 27 from the platform 11a onto the guide 32 when the respective receptacle 29 registers with the group 6 of ducts 109a, and the mouthpiece 39 facilitates the transfer of a layer 28 onto the guide 33 while the respective receptacle 29 dwells in a position of register with the group 7.

FIGS. 3a, 3b and 3c show that the length of the receptacles 29, as considered in the direction of reciprocation of the pushers 22–24, is somewhat less than the length of a cigarette 8. Therefore, the tobacco-containing portions T of cigarettes 8 extend beyond the bottom panels 29a into abutment with the stop 31, and the filter plugs F of the cigarettes 8 extend beyond the left-hand sides of the receptacles 29 and are respectively overlapped by the guides 32, 33, 34 during transport from the platform 11 to the evacuating station 36.

The operation of the improved apparatus is as follows:

The supply magazine 1 continuously accumulates successive layers 26, 27 and 28 of cigarettes 8 which respectively rest on the platforms 11, 11a and 11b. The operation of the piston rod 13A is synchronized with the operation of drive means for the conveyor 3 so that the support 13 moves from the first end position of FIG. 1 to the other or second end position while the conveyor 3 is advanced by a step in the direction which is indicated by the arrow 2. This ensures that the lowermost layers 26, 27, 28 are condensed (the neighboring cigarettes of each of these layers contact each other) before the pushers 22–24 (whose movements are also synchronized with movements of the support 13 and conveyor 3) perform forward strokes to expel the condensed layers 26, 27, 28 through the respective openings 18, 19, 21 and into the corresponding (aligned) receptacles 29 of the conveyor 3. As mentioned before, each median layer 27 contains six parallel cigarettes 8, and each of the layers 26, 28 contains seven parallel cigarettes 8. The cigarettes 8 which fill the upper portion of the supply magazine 1 descend by gravity; however, their downward movement can be assisted or promoted by the aforementioned agitating elements which are installed in the interior or the upper portion of the supply magazine. The agitating elements can be located at the upper ends of the partitions 9, 9a, 9b so as to facilitate entry of the cigarettes 8 into the respective ducts 109, 109a, 109b. The height of each of the apertures for entry of the pushers 22–24 into the magazine 1 need not equal the diameter of a cigarette 8. Such height can amount to a small fraction of a cigarette diameter as long as it suffices to permit penetration of a pusher having a requisite thickness to guarantee reliable expulsion of a complete layer 26, 27 or 28 through the respective opening 18, 19 or 21 and into the adjacent receptacle 29. If desired, the three pushers 22, 23, 24 can constitute the prongs of a larger one-piece pusher which is reciprocable in directions indicated by the arrows 22A, 23A, 24A to effect expulsion of three layers (26, 27, 28) whenever it performs a working stroke in a direction toward the receptacles 29 of the conveyor 3. The conveyor 3 is at a standstill whenever the pushers 22–24 perform their working strokes.

The provision of a reciprocable support 13 is desirable in order to allow for condensation of the layers 26, 27, 28 prior to transfer of such layers into the adjacent receptacles 29. The width of the gaps between the cigarettes 8 which form the uncondensed layers 26, 27, 28 corresponds to the thickness of the lowermost portions of the partitions 109, 109a, 109b. The width of the openings 18, 19, 21 respectively matches the width of condensed layers 26, 27, 28.

The piston rod 13A returns the support 13 to the first end position of FIG. 1 as soon as the pushers 22, 23, 24 complete their working strokes and return to the retracted positions of FIGS. 3a, 3b and 3c. This enables fresh layers (26, 27, 28) of cigarettes 8 to immediately descend onto the platforms 11, 11a and 11b of the support 13. The actual condensing means are the shoulders 14, 16, 17 of the support 13. These shoulders cooperate with the stationary walls 11A, 11B, 11C when the piston rod 13A moves the support 13 in a direction to the right, as viewed in FIG. 1.

The distance between the shoulders 14, 16 equals or approximates the distance between the shoulders 16, 17. The extent of each stepwise movement of the conveyor 3 in the direction indicated by arrow 2 is selected in such a way that a receptacle 29 registers with the opening 18 when the two preceding receptacles 29 respectively register with the openings 19 and 21 of the supply magazine 1. Thus, the conveyor 3 is ready to accept three layers (26, 27, 28) of cigarettes 8 whenever the pushers 22-24 perform their working strokes. Whenever the conveyor 3 advances by a step, one of its receptacles 29 transports a fully assembled array or block ST of twenty cigarettes 8 beyond the platform 11 and on toward the evacuating station 36. The evacuating station 36 can be placed nearer to or further away from the stationary wall 11D of the supply magazine 1, depending on the layout of the packing machine. At the evacuating station 36, a plunger 23b (indicated in FIG. 2 by broken lines) enters one end of a filled receptacle 29 to expel a full array or stack ST from such filled receptacle and into the channel 136 or into a hollow mandrel of the packing machine. The mandrel can be draped into one or more envelopes which are open at one end and closed at the other end so that, when the array ST is expelled from and beyond the mandrel, it can strip the respective envelope or envelopes off the mandrel and is thereupon confined in the respective envelope or envelopes. The envelopes are thereupon closed at the other ends to form finished cigarette packs. Reference can be had to the aforementioned commonly owned U.S. patent to Kruse et al.

The guides 32, 33, 34 prevent undesirable shifting or changes of orientation of the cigarettes 8 during transfer into the receptacles 29 as well as during sidewise transport in the receptacles 29 toward the evacuating station 36. The mouthpieces 37, 38, 39 guarantee unimpeded transfer of layers 26, 27, 28 from the respective platforms 11, 11a, 11b into the adjacent receptacles 29 of the conveyor 3.

An important advantage of the guide members or guides 32-34 is that they prevent changes in orientation of cigarettes 8 during sidewise transport of layers 26, 27, 28 in the receptacles 29 of the conveyor 3. Changes in orientation are prevented even if the conveyor 3 is driven at a high speed and is abruptly accelerated to such high speed and/or abruptly decelerated from such high speed to zero speed. The guides are simple, inexpensive and readily accessible for cleaning or replacement. Each such guide may constitute a simple plate, strip or rail which is fixedly secured to or forms part of the frame of the apparatus or packing machine. Since the guides 32-34 are preferably located above the filter plugs F which are sturdier than the tobacco-containing portions T, they are not likely to damage or deface the cigarettes 8 of the respective layers 26-28. The configuration of receptacles 29 also contributes to prevention of changes of orientation of cigarettes 8 on the conveyor 3; as stated above, the width of the interior of the receptacles 29 is such that they can only accommodate condensed layers 26, 27 and 28. The placing of guides 32-34 into close or immediate proximity of the supply magazine 1 is desirable because this ensures that the cigarettes 8 are properly guided and confined during the initial stage of transfer of the layers 26, 27, 28 into the adjacent receptacles 29. The utilization of receptacles 29 which are shorter than a cigarette 8 contributes to lower cost and lower weight of the conveyor 3. Lower weight contributes to a reduction of inertia so that the conveyor 3 can be abruptly accelerated from zero speed to a relatively high-speed or vice versa.

The utilization of relatively long guides is desirable to ensure that the layers 26-28 are properly confined during transport from the platforms 11, 11a, 11b and all the way into register with the plunger 23b. Partial overlapping of the guides 32, 33 and 33, 34 also contributes to a reduction of the likelihood of misorientation of cigarettes 8 during insertion into and during travel with the receptacles 29. The extent of overlap equals or approximates the width of the group 6 or 7, i.e., the width of the platform 11a or 11b.

The improved apparatus is susceptible to many modifications without departing from the spirit of the invention. For example, the apparatus can be designed to accumulate blocks or arrays each of which comprises four or more superimposed layers or each of which comprises two superimposed layers. By way of example, certain packs contain arrays of ten cigarettes in the form of two layers of five cigarettes each. If the apparatus is designed for accumulation of such stacks, the conveyor 3 carries modified receptacles 29 wherein the projections or beads 29a, 29e can be dispensed with because the cigarettes of the upper layer are in exact register with the cigarettes of the layer therebelow. It is further clear that the number of cigarettes in each of the layers can be changed, depending on the desired formation of arrays which accumulate in filled receptacles. Furthermore, the platforms 11, 11a, 11b need not be exactly horizontal, i.e., the conveyor 3 can be caused to advance along a path which need not be horizontal. Still further, the magazine 1 can receive a continuous or intermittent stream of plain cigarettes, or plain or filter-tipped cigarillos, cigars, or cheroots. All such modifications will be readily understood by men having the necessary skill in this art without resort to additional illustrations.

The guides 32, 33, 34 can overlie the major portions of or the entire layers 26, 27, 28, i.e., such guides can extend from the magazine 1 close to or all the way into contact with the stop 31.

The reciprocable support 13 can be replaced with a stationary support if the supply magazine 1 comprises three discrete condensing devices, one for each of the platforms 11, 11a, 11b. Each condensing device embodies or includes means for reciprocating one of the shoulders 14, 16, 17. The reciprocable support 13 is preferred at this time because it is simpler and more readily reciprocable than several discrete condensing devices. Such one-piece reciprocable support is especially advantageous when the groups 4, 6, 7 of ducts 109, 109a, 109b are closely adjacent to each other.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of my contribution to the art and, therefore, such adaptations should and are intended to be comprehended within the meaning and range of equivalence of the appended claims.

I claim:

1. Apparatus for assembling arrays of overlapping layers of parallel cigarettes or analogous rod-shaped articles which constitute or form part of smokers' products, comprising conveyor means movable stepwise in a predetermined direction along a predetermined path and including a series of receptacles; a magazine for storage of a supply of parallel articles, said magazine having a series of elongated openings, as considered in said direction, said openings being disposed in different planes and each thereof registering with a different receptacle during each period of dwell of said conveyor means, said magazine further having several groups of ducts, one group for each of said openings, for accumulation of successive layers of parallel articles in alignment with the corresponding openings; means for transferring layers of articles through said openings and into the registering receptacles during the intervals of dwell of said conveyor means whereby each receptacle which registers with a preceding opening, as considered in said direction, contains a lesser number of layers than the next-following receptacle wherein the layers overlie each other as a result of disposition of said openings in different planes; and stationary guide members adjacent to said openings and each overlying at least a portion of the layer which issues by way of the adjacent opening, said guide members being spaced apart from each other and the guide member which is adjacent to a preceding opening being overlapped by the guide member which is adjacent to the next-following opening, such guide members overlapping each other at least along the length of the next-following opening.

2. The apparatus of claim 1, wherein said transferring means comprises reciprocable pushers, one for each of said openings.

3. The apparatus of claim 1, wherein said guide members are disposed between said magazine and said series of receptacles and each thereof extends in said predetermined direction.

4. The apparatus of claim 3, wherein each of said guide members has a mouthpiece which is adjacent to the respective opening and through which the layers of articles are expelled from the magazine into the registering receptacle of said conveyor means.

5. The apparatus of claim 4, wherein said mouthpieces flare outwardly in a direction toward the respective openings.

6. The apparatus of claim 1, wherein the articles of the layers in said magazine are normally spaced apart from each other and further comprising means for condensing such layers prior to expulsion of the layers from the magazine by way of the respective openings so that the neighboring articles of each layer are immediately adjacent to or contact each other.

7. The apparatus of claim 6, wherein said condensing means includes means for shifting one outermost article of each layer in a direction toward the other outermost article of the respective layer.

8. The apparatus of claim 7, wherein said magazine further includes a common support for the layers of articles which register with said openings, said support having surfaces which constitute said shifting means and further comprising means for reciprocating said support in and counter to said direction.

9. The apparatus of claim 8, wherein said support has a plurality of platforms disposed at different levels and each supporting a layer in register with the corresponding opening of said magazine.

10. The apparatus of claim 1, wherein said openings are substantially horizontal slots which are disposed at different levels, the level of each preceding opening, as considered in said direction, being lower than the level of the next-following opening.

11. The apparatus of claim 1, wherein each of said receptacles has a first open end facing said magazine and a second open end facing away from said magazine, and further comprising stop means adjacent to the second open ends of said receptacles to limit the extent of movement of articles of said layers under the action of said transferring means.

12. Apparatus for assembling arrays each of which contains three overlapping layers of parallel cigarettes or analogous rod-shaped articles which constitute or form part of smokers' products, comprising conveyor means movable stepwise in a predetermined direction along a predetermined path and including a series of receptacles; a magazine for storage of a supply of parallel articles, said magazine having three openings including a foremost opening, a second opening and a third opening, as considered in said direction, said openings being disposed in different planes and each thereof registering with a different receptacle during each period of dwell of said conveyor means, said magazine further having several groups of ducts, one group for each of said openings, for accumulation of successive layers of parallel articles in alignment with the corresponding openings; means for transferring layers of articles through said openings and into the registering receptacles during the intervals of dwell of said conveyor means whereby each receptacle which registers with a preceding opening, as considered in said direction, contains a lesser number of layers than the next-following receptacle wherein the layers overlie each other as a result of disposition of said openings in different planes; and guide members adjacent to said openings and including a first guide member which overlies at least a portion of a layer issuing from said first opening and extends in said direction toward and along said second opening, a second guide member which overlies at least a portion of a layer issuing from said second opening and extends in said direction toward and along said third opening, and a third guide member which overlies at least a portion of a layer issuing from said third opening and extends beyond said third opening, as considered in said direction.

13. The apparatus of claim 12, further comprising an evacuating station located downstream of said third opening, as considered in said direction, said third guide member extending toward and along said evacuating station.

14. The apparatus of claim 13, further comprising means for expelling arrays of articles from successive receptacles at said evacuating station during the periods of dwell of said conveyor means.

* * * * *